United States Patent [19]

Chipps

[11] Patent Number: 5,380,440
[45] Date of Patent: Jan. 10, 1995

[54] TWO DEWATERING OF SLURRIES CONTROLLED BY VIDEO SYSTEM

[75] Inventor: Evan R. Chipps, Olivedale, South Africa

[73] Assignee: Anikem Pty. Limited, Transvaal, South Africa

[21] Appl. No.: 64,265

[22] Filed: May 20, 1993

[51] Int. Cl.$^6$ .............................................. B01D 17/12
[52] U.S. Cl. .................................. 210/709; 210/745; 210/770; 210/777
[58] Field of Search ................ 210/94, 96.1, 193, 143, 210/198.1, 359, 709, 739, 745, 770, 777, 783, 784; 364/502, 713

[56] References Cited

U.S. PATENT DOCUMENTS

| | | | |
|---|---|---|---|
| 3,693,797 | 9/1972 | Topol | 210/193 |
| 4,810,371 | 3/1989 | Fonesca | 210/744 |
| 4,990,261 | 2/1991 | Ho | 210/745 |
| 5,037,559 | 8/1991 | Schmitt | 210/745 |
| 5,200,086 | 4/1993 | Shah et al. | 210/745 |

*Primary Examiner*—Joseph W. Drodge
*Attorney, Agent, or Firm*—Robert A. Miller; James J. Drake

[57] ABSTRACT

A process for dewatering a slurry, which comprises introducing a dewatering aid into a slurry of solids in water to condition the slurry. The conditioned slurry is then passed into a filtration zone where water is filtered off from the solids. Images of the dewatered solids are recorded with a video camera and digitized. The recorded images are compared with digitized desired images representing desired moisture levels. The recorded images versus the desired images are converted into analogue signals which are indicative of the moisture content of the dewatered solids.

1 Claim, 1 Drawing Sheet

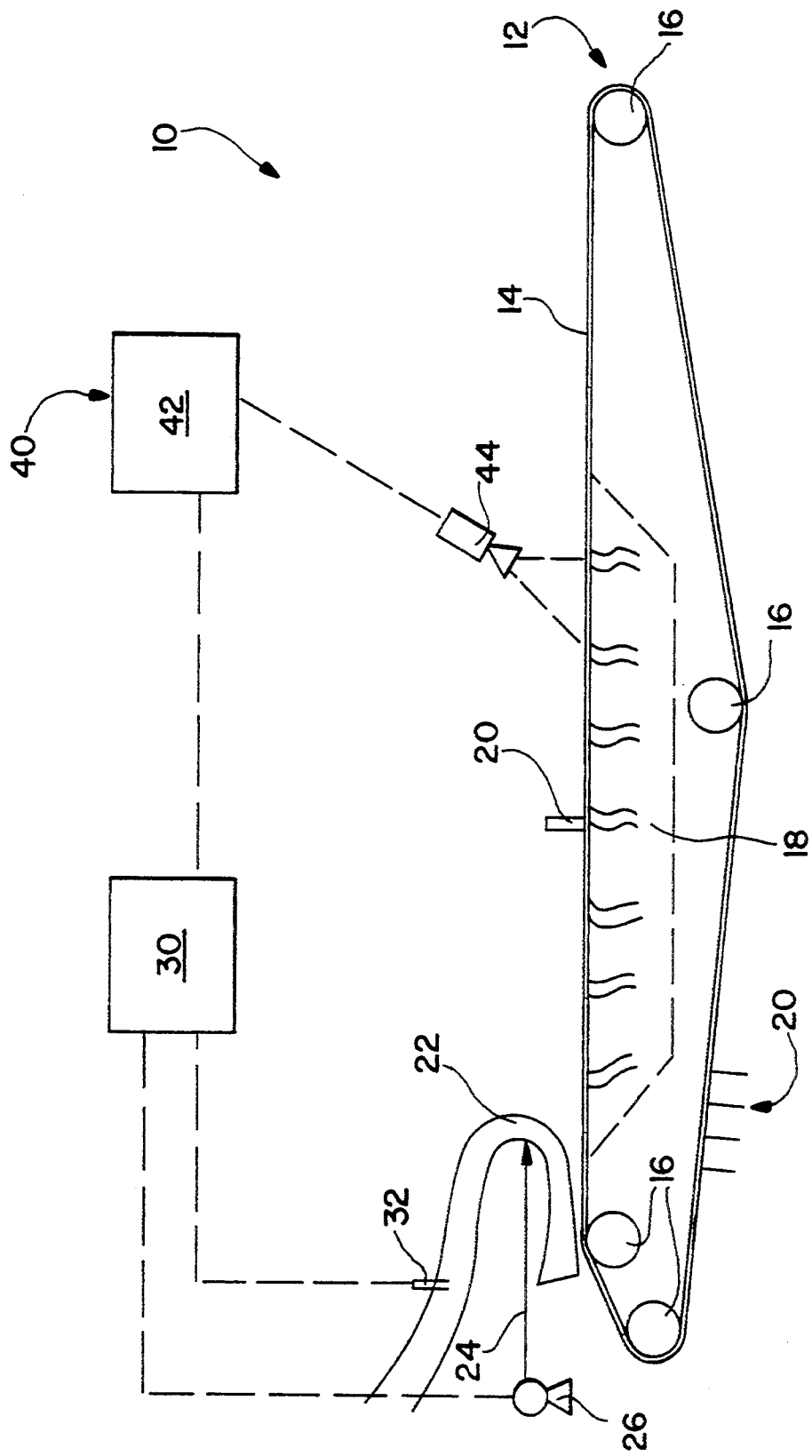

TWO DEWATERING OF SLURRIES CONTROLLED BY VIDEO SYSTEM

This invention relates to the dewatering of slurries. It relates in particular to a process for dewatering a slurry, and to slurry dewatering apparatus.

According to a first aspect of the invention, there is provided a process for dewatering a slurry, which comprises introducing a dewatering aid into a slurry of solids in water, thereby to condition the slurry;

passing the conditioned slurry into a filtration zone where water is filtered off from the solids;

recording images of the dewatered solids with a video camera;

digitizing the recorded images;

comparing the recorded images with digitized desired images representing desired moisture levels; and converting the recorded images versus the desired images into analogue signals which are indicative of the moisture content of the dewatered solids.

The analogue signals thus represent moisture levels which are equal to, greater than or less than desired moisture levels. The process may thus includes calibrating the analogue signals, and adjusting, if necessary, the rate of dewatering aid addition and/or the degree of filtration in the filtration zone in response thereto, to bring the dewatered solids moisture content within the acceptable levels.

The calibrating may be effected by means of a suitable programmed computer.

While the slurry can, in principle, be any water-based slurry, the Applicant believes that the process will have particular application on slurries produced in the mineral mining industries, such as coal fines slurries produced during the processing of run-of-mine coal into power station grade coal and/or coking coal, or the like.

The introduction of the dewatering aid into the slurry may be effected by injecting or adding it into the slurry in liquid form by means of injection means such as a pump. The injection means may thus be operatively connected to the computer so that the injection means output is adjusted in response to the analogue signals or outputs measured and compared by the computer.

The dewatering aid may comprise at least one flocculant, coagulant, surfactant, or a combination of two or more of those. The flocculant, where present, may be anionic, nonionic or cationic, and may be a polymer such as a polyacrylate. Typically, an anionic, nonionic and cationic flocculant can be injected or added, with the three flocculants being added separately. The dewatering aid acts by agglomerating water particles by means of absorption or entrapment, thereby enhancing the ease with which the water can be filtered off.

The filtration in the filtration zone may be effected under vacuum. The filtration zone may be provided by any suitable vacuum filter, such as a drum filter, a disc filter, or a belt filter, or by a pressure filter.

The process may include a vision inspection system of which the video camera forms part. The vision inspection system may also include a vision input module to which the video camera is operatively connected. The vision inspection system is adapted to form binary images of the recorded images according to the setting of the appropriate adaptive threshold; to set each pixel to a 0 or 1, representing black or white respectively; and to effect comparison by counting black or white pixels, and comparing them with predetermined levels thereof, with the black and white pixels thus providing grey level representations in which the shade or grey is indicative of the moisture content of the dewatered solids, while the predetermined levels thereof correspond to predetermined grey level representations which in turn correspond to known or predetermined water levels in the solids. In this fashion it can thus be determined if the moisture content of the dewatered solids falls outside aceptable limits.

The vision inspection system may also include a TV monitor, and a light source illuminating the dewatered sludge. The light source may comprise a fluorescent and/or a strobe lighting source.

The vision inspection system may be that available from Allen-Bradley.

The process may include controlling the various process steps automatically, and this may be effected by means of the computer, with the output from the vision inspection system being processed in the computer, which is then also coupled to the dewatering aid injection means and filtration zone control means selected from the group comprising vacuum generating means, cake thickness regulating means, belt/drum speed regulating means, and slurry flow control means, with the vision inspection system constituting a feedback dewatering control system. The computer may be a P.L.C. ('Process Logic Control') or a P.C. ('Personal Computer'). Instead, the vision inspection system may be such that it constitutes a feed-forward dewatering control system for the process.

The process may also include a, or a further, feed-forward control system for predetermining the required dosage rate of dewatering aid. This feed-forward control system may include measuring one or more of the following slurry properties: particle size, particle shape, slurry density, and slurry concentration, and comparing the measured values with an initial or primary predetermination of dewatering aid demand; the process including then using the feed-back or feed-forward control of the vision inspection system to refine or optimize the dewatering aid addition. The feed-forward control system, when present, can be the OPTICUS (trade mark) Intelligent Process Control (trade mark) System, available from Nalco Chemical Company, One Nalco Center, Naperville, Ill., U.S.A.

According to a second aspect of the invention, there is provided slurry dewatering apparatus, which comprises conduit means along which a slurry of solids in water can be conveyed;

dewatering aid addition means for introducing or adding a dewatering agent into slurry flowing along the conduit means;

filtration means into which the conduit means discharges, with water being separated from the solids in the filtration means;

a video camera for recording images of dewatered solids in, or from, the filtration means;

a vision control module operatively connected to the video camera such that images recorded by the video camera can be converted into analogue signals, the analogue signals digitized into grey level representations of the recorded images, and these grey level representations, wherein the shade of grey is indicative of the moisture content of the dewatered solids, compared with pre-determined grey level representations corresponding to known or pre-determined water levels in the solids, thereby to determine if the moisture content of the dewatered solids falls outside acceptable limits; and adjustment means for adjusting the rate of dewatering aid addition and/or the degree of filtration in the filtration means in response thereto, to bring the dewatered solids moisture content within the acceptable levels.

As stated hereinbefore, the dewatering aid addition means may comprise at least one pump, while the filtration means may comprise at least one drum filter, disk filter, belt filter or pressure filter. As also mentioned hereinbefore, the video recorder, and vision input module may form part of a vision inspection system, and the adjustment means may comprise a computer.

The apparatus may also include a feed-forward logic control system for predetermining the required dosage rate of dewatering aid, as hereinbefore described.

The invention will now be described by way of non limiting example, with reference of accompanying diagrammatic drawing which shows, in line diagram form, a process according to the invention for dewatering a slurry.

In the drawing, reference numeral 10 generally indicates a process according to the invention for dewatering a slurry.

The process 10 comprises a belt filter, general indicated by reference numeral 12. The belt filter 12 comprises a continuous filter belt 14 passing over a plurality or spaced rollers 16. At least one of the rollers 16 is provided with drive means (not shown) such as a gear box and motor.

Below a horizontally extending run of the belt is provided vacuum generating means 18, with a rubber leveling skirt 20 being provided above this run of belt.

The belt filter 12 also includes a washing system 20.

A slurry feed conduit 22 has a discharge opening located at one end of the horizontal belt run, while a flocculent addition conduit 24 leads into the conduit 22 upstream of its discharge end. The conduit 24 is fitted with a pump 26 which draws flocculant from a storage tank.

The process 10 also includes an Opticus (trade mark) Intelligent Process Control system 30, available from Nalco Chemical Company. The system 30 is operatively connected to the pump 26 so as to control the dosage of flocculant into the slurry passing along the conduit 22. The system 30 is also operatively connected to probes 32 for measuring the particle size, particle shape, slurry density and slurry concentration. The system 32 can also be operatively connected to the filter belt drive means to control the filter belt speed and/or the vacuum generating means 18 to control the degree of vacuum generated. The system 30 can also be operatively connected to any other suitable process control means such as the slurry pump or the like. The system 30 includes an intelligent process control or personal computer for effecting the necessary control of the various process variables automatically. However, instead of the system 30, a PLC or PC can be used, if desired.

The process 10 also includes a vision inspection system, generally indicated by reference numeral 40. The system 40 includes a vision input module 42 which is operatively connected to the system 30. The system 40 also includes a video camera 44 operatively connected to the module 42 and directed onto the horizontal belt run downstream of the vacuum generating means 18. If necessary, the system 40 may also include one or more forms of lighting, such as florescent or strobe lighting, for illuminating that portion of the belt onto which the video camera 44 is directed.

In use, a slurry to be dewatered passes along the conduit 22. A suitable flocculent such as a polyacrylate is introduced along the conduit 24. By means of the probes 32, the slurry particle size and shape, slurry density and slurry concentration are determined, and compared to pre-determine values by the PC in the system 30. Based thereon, an initial pre-determination of the dosage rate of flocculent along the conduit 24 is made. An appropriate signal passes to the pump 26 so that the dosage rate is controlled accordingly.

As the slurry is deposited onto the horizontal run of the filter belt 14, water is drawn off by means of the vacuum generated by the vacuum generating means 18. The solids remaining on the belt are spread evenly by means of the rubber skirt, and images of the de-watered solids are recorded with the camera 44. The camera 44 converts these images into real time analogue signals which are digitized in the module 42, into grey level representations of the recorded images. Binary images are formed according to the setting of the appropriate adaptive threshold. Each pixel is then set to a 0 or 1, representing black or white respectively. In the module 42, the black or white pixels are counted, and compared with preset limits thereof, corresponding to pre-determined grey level representations which in turn correspond to known or predetermined water levels in solids. In this fashion, it is determined whether or not the moisture content of the dewatered solids falls outside acceptable limits. If they do, a appropriate signal is passed by the output of the module 42 to the system 30 which can then adjust the rate of flocculent addition and/or any other process variable.

Typically the horizontal run of the belt 14 can have an area of about 80 m$^2$, but this can vary from about 8 to about 120 m$^2$. Furthermore, the horizontal run of the belt is typically about 12 meters, from the point of slurry deposition thereon to the rubber skirt 20; thereafter there can be a further run of about 3 meters before the video camera 44 is encountered, and then a run of about 18 meters before the dewatered solids are discharged from the belt. Typically, the camera 44 can be mounted about 600 mm above the belt, to give a vision window of 45 cm wide and 32 cm deep.

Typically the slurry feed is a coal fines slurry obtained during the processing of run-or-mine coal into power station coal and coking coal. During this processing, the coal is subjected to various milling and separation steps, during which the fine slurry is produced.

The applicant believes that with the process 10 in which the moisture content of the dewatered solids is monitored in feed back fashion, the rate of additive addition can be optimised.

In a preliminary confidential technical trial which was conducted, a solid state video camera 44, together with its vision input module 42, was set up over one of 120 m$^3$ belt filters. Dewatered solids moisture content was monitored via the video camera and module. This, together with the flow of slurry feed onto the belt, was used to control the mount of polymer needed to attain a dewatered solids moisture content of about 30%. The flocculent addition pump output was also monitored. It was found that the pump output closely followed the changing belt moisture content, indicating the efficacy of the process of the according to the invention for dewatering slurries.

The process 10 according to the invention has the following benefits and advantages:

lower slurry moisture levels can be achieved then are obtainable with known processes, leading to cost saving arising from reduced mine penelty costs;

greater throughputs are obtainable, leading to increased profitability;

low labour costs;

low downtime and maintenance;

reduced flocculant and dewatering aid consumption, leading to reduced operating costs.

I claim:

1. A process for dewatering a coal fines slurry of solids in water, which comprises the steps of:

introducing a dewatering aid selected from the group consisting of flocculants, coagulants, surfactants and mixtures thereof via an injection means into the slurry at an initial predetermined dosage rate to condition the slurry;

passing the conditioned slurry into a filtration zone including filtration means to filter the solids in the slurry from the water in the slurry, thereby forming dewatered solids;

recording images of the dewatered solids after filtration with a vision inspection system, the vision inspection system including a video camera, a television monitor, a light source, and a vision input module operatively connected to the video camera, the vision inspection system being adapted to form binary images of recorded images as black and white pixels and to effect comparison by counting said black and white pixels and comparing with predetermined levels thereof, with the counted black and white pixels thus providing grey level representations in which the shade of grey is indicative of the moisture content of the dewatered solids, while the predetermined levels thereof correspond to predetermined grey level representations which in turn correspond to known or predetermined water levels in the solids;

digitizing the recorded images of the dewatered solids;

comparing the digitized recorded images of the dewatered solids with digitized desired images representing desired moisture levels of the dewatered solids;

converting the differences between the digitized recorded images of the dewatered solids versus the digitized desired images of the dewatered solids into analogue signals which are indicative of the difference between the moisture level of the dewatered solids and the desired moisture level of the dewatered solids;

calibrating the analogue signals by means of a computer, said computer being operatively connected to the injection means and the filtration means;

predetermining the dosage rate of the dewatering aid to condition the slurry via a feedforward control system which measures at least one property of the slurry selected from the group consisting of particle size, particle shape, slurry density, and slurry concentration, and comparing the measured at least one property to predetermined values for the at least one property to determine the predetermined dosage rate to condition the slurry; and controlling the injection means and the filtration means in response to the calibrated analogue signal to adjust the dosage rate of the dewatering aid injection means and the amount of solids filtered from the water in the slurry in the filtration zone to adjust the moisture content in the dewatered solids to the desired moisture levels wherein the vision inspection system is a feedback control system used to adjust the dewatering aid dosage rate.

* * * * *

UNITED STATES PATENT AND TRADEMARK OFFICE
CERTIFICATE OF CORRECTION

PATENT NO. : 5,380,440
DATED : JANUARY 10, 1995
INVENTOR(S) : EVAN R. CHIPPS

It is certified that error appears in the above-indentified patent and that said Letters Patent is hereby corrected as shown below:

ON THE TITLE PAGE ITEM [54] AND COLUMN 1, LINES 2 AND 3:

TWO DEWATERING OF SLURRIES CONTROLLED BY VIDEO SYSTEM

"LETTERS PATENT SHOULD READ AS:"

DEWATERING OF SLURRIES CONTROLLED BY VIDEO SYSTEM

Signed and Sealed this

Twenty-fifth Day of April, 1995

Attest:

BRUCE LEHMAN

*Attesting Officer*     *Commissioner of Patents and Trademarks*